UNITED STATES PATENT OFFICE.

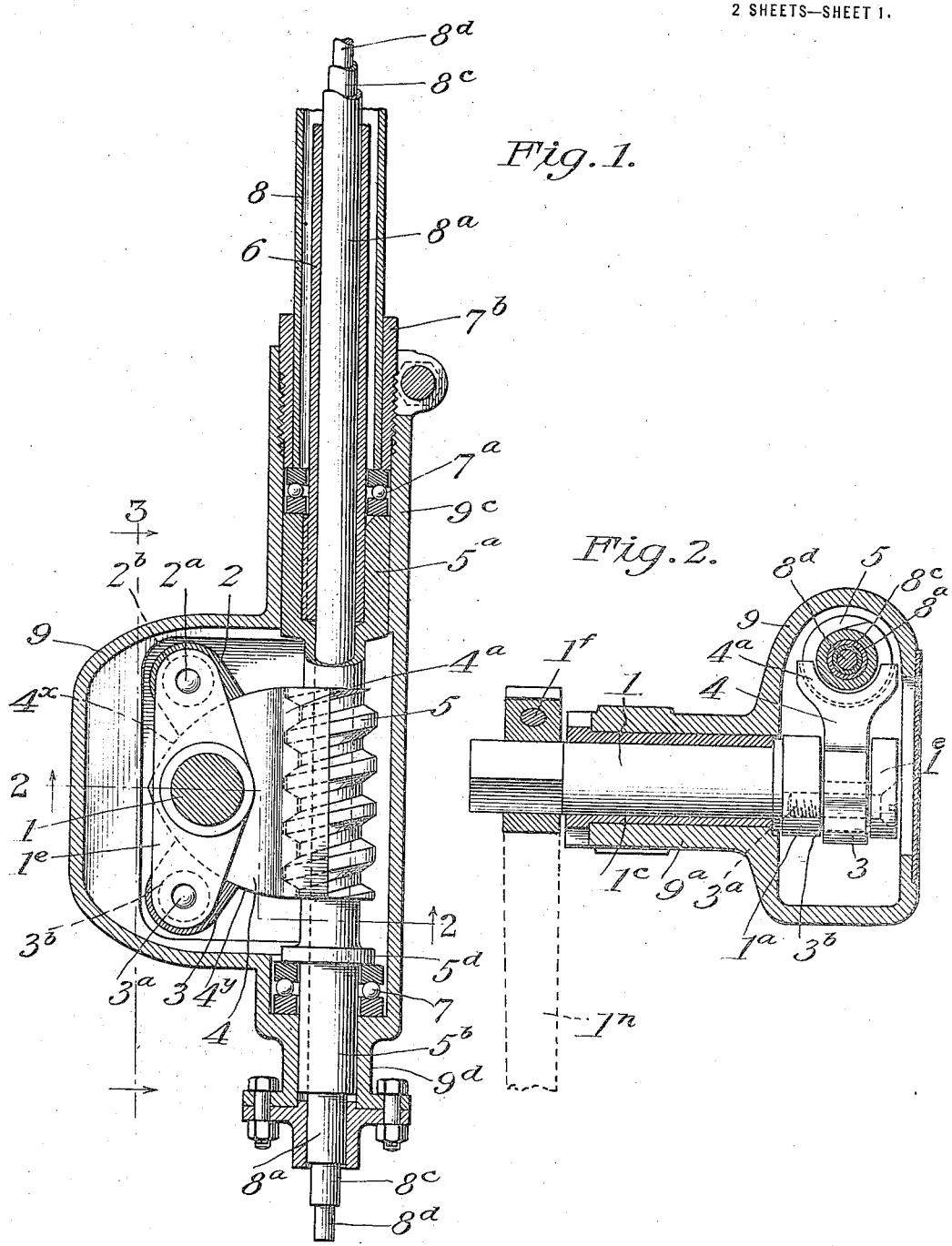

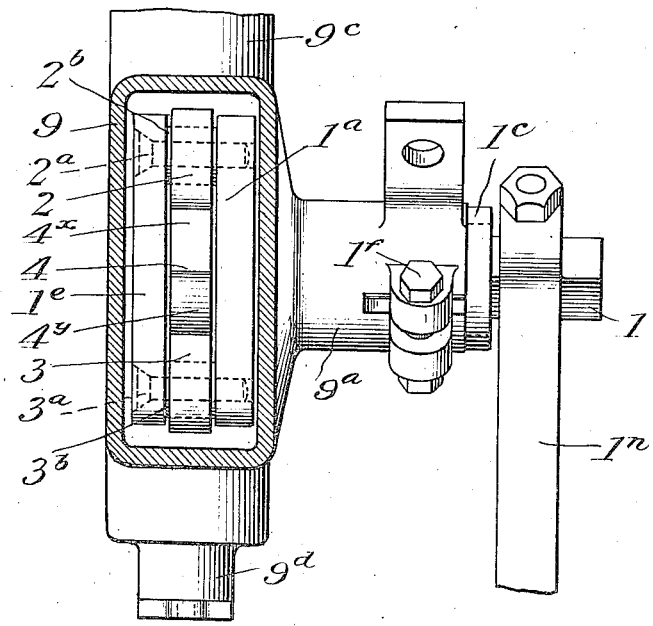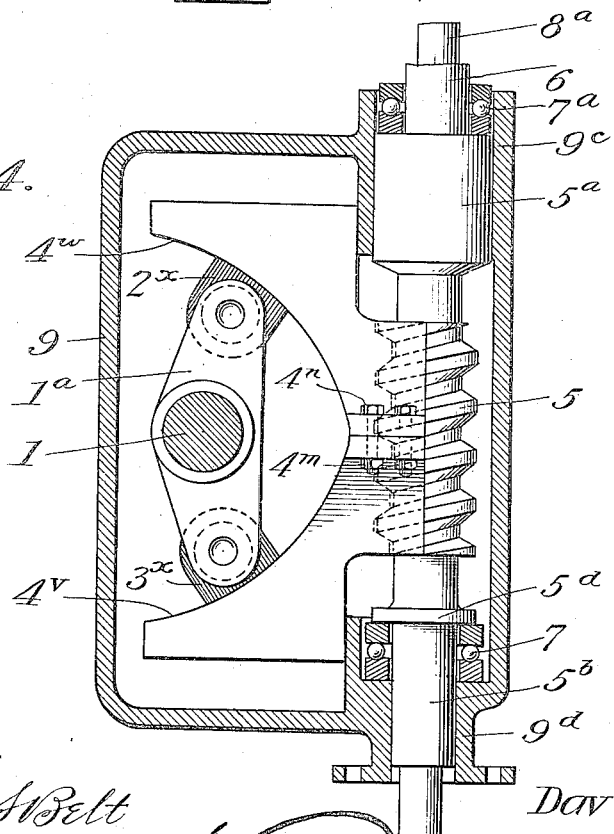

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,184,384.  Specification of Letters Patent.  Patented May 23, 1916.

Application filed March 19, 1913. Serial No. 755,354.

*To all whom it may concern:*

Be it known that I, DAVID E. ROSS, of La Fayette, in the county of Tippecanoe and State of Indiana, have invented certain new and useful Improvements in Steering-Gear; and I hereby declare that the following is a full, clear, and exact description thereof, reference being had to the accompanying drawings, which form part of this specification.

This invention is a novel steering gear for automobiles, motor boats, and the like; and has particular reference to mechanism for positively holding and shifting the ball-arm, or steering crank; and its object is to provide a steering gear whereby the vehicle steering wheels can be readily shifted, as desired, and will be safely held in any adjusted position without liability of danger from the motion being reversed; that is of any strain on the vehicle wheels or steering-crank improperly shifting the steering gear.

An important feature of the invention is that all the wearing surfaces of the gear are adjustable or can be compensated for wear.

In order to more readily impart a clear and full understanding of the nature of the invention and the essential novel features thereof I will describe a practical form of steering gear embodying the invention and explain the operation thereof; and set forth in the claims the essential characteristics of operation and relation of parts in which the invention resides and the subordinate features of construction and arrangement of parts for which I desire protection.

In said drawings:—Figure 1 represents a longitudinal sectional view through the steering head embodying the at present preferred form of the invention. Fig. 2 is a section on line 2—2, Fig. 1. Fig. 3 is a section on line 3—3, Fig. 1. Fig. 4 illustrates a modification of the construction.

1 designates a rocker-shaft, which is journaled in a lateral tubular extension $9^a$ of a casing or housing 9, in which the principal operative parts of the steering gear are inclosed. On the outer end of this rocker-shaft is mounted a ball-arm, or steering-crank $1^n$, which may be of any suitable construction and connected in the usual way to the cranks on the guiding wheels of the vehicle. To the inner end of this rocker-shaft 1 is fixedly secured a double armed lever $1^a$; and to the opposite arms of this lever, at opposite sides of the shaft 1 and equi-distant therefrom, are attached similar but oppositely disposed shoes 2 and 3, which shoes are respectively pivoted on studs $2^b$, $3^b$ on the arms of lever $1^a$. A tie-bar $1^c$ is secured to the studs at the sides of the shoes 2 and 3, opposite the lever $1^a$, by bolts $2^a$, $3^a$ as shown.

The shoes, 2 and 3, engage oppositely facing cams. In Fig. 1 the opposite cams or cam surfaces, $4^x$ and $4^y$, are formed on a cam member 4 which is supported in the casing adjacent the end of the shaft 1, and preferably lies between the shoes 2 and 3 as shown in Fig. 1. The cam member 4 is formed or rigidly connected with an integral worm threaded head $4^a$ which engages a worm 5 that is formed on or connected with the steering shaft 6. For convenience of assembling, the head $4^a$ may be made in the form of a half-worm-nut, but obviously could be made a cylindrical worm-nut and wholly surround worm 5. In either case it will be seen that if the worm 5 is rotated, cam member 4 will be moved transversely of the shaft 1, and will, by reason of the engagement of its opposite cam faces $4^x$ and $4^y$ with the faces of the shoes 2 and 3, cause shaft 1 to rock either right or left, according to the direction of the movement of the cam member 4.

The cam surfaces $4^x$, $4^y$, which engage the shoes 2 and 3, are so proportioned and the parts so adjusted that close contact is always maintained between such surfaces and the shoes. If the cam 4 is moved down, Fig. 1, the shoe 3 will be forced to the left thus rocking shaft 1 clockwise; and if the cam 4 be moved up, Fig. 1, the shoe 2 will be forced to the left and rock the shaft 1 anti-clockwise. The shoes and cam are preferably relatively so proportioned and adjusted that close engagement will always be maintained between the faces of the shoes with the respective opposed cam surfaces of the cam member 4. As the cam 4 is moved by a worm or screw the pitch of the threads can be such that no movement will be imparted to the cam 4 in either direction by pressure exerted reversely on the shaft 1; and the shaft 1 be positively locked against actuation by the shoes 2 and 3 engaging cam member 4. By altering the cam surfaces and the pitch of the worm threads the gear can be made semi-back locking; that is if the pitch of the cams was more nearly straight—and the pitch of the worm screw was greater, the steering-crank might produce a slight rotary effect upon the steering wheel, or shaft 6, but so slight that the drivers would experience no inconvenience or danger therefrom.

The cam member 4 can be readily shifted transversely of the shaft 1 by rotating worm 5 and this rotation of the worm 5 can be effected with comparatively little effort but will, through the cam and shoes, rock the shaft 1 more slowly and with great power.

The pitch of the worm or screw threads is such that rotary movements of the worm will suffice to move the rocker-shaft 1 through the greatest arc required in steering the vehicle.

The worm 5 may be connected to a steering shaft 6, and mounted in the casing 9 in any suitable way, and be of any preferred construction. Preferably as shown in the drawings, the worm 5 is provided with a hollow trunnion $5^a$ at its upper end and a hollow trunnion $5^b$ at its lower end, which trunnions are journaled in bearings formed in cylindric extensions $9^c$ and $9^d$ of the casing 9, such extensions being at right angles to the extensions $9^a$ of the casing. The worm 5 is provided near its lower end with a step flange $5^d$ which is supported on ball-thrust bearings 7 of suitable construction; and the upper end of the trunnion $5^a$ also has a bearing against a ball-thrust bearing $7^a$ which may be secured in the tubular extension $9^c$ by a tubular bushing $7^b$ in the usual manner. The steering shaft 6 preferably has its lower end entered into the socket in the cylindric upper end $5^a$ of the worm, and made fast thereto by brazing, or in any other suitable manner, so that the worm and steering shaft are practically integral.

As shown, the steering shaft is inclosed in an ordinary casing tube 8 attached to the housing 9; and the control tube $8^a$, throttle tube $8^c$, and spark controlling rod $8^d$, extend axially through the hollow steering shaft and worm, in the usual manner. These parts may be of any desired construction, and are not features of the present invention, which resides in the novel means for positively operating the rocker-shaft and holding it in any adjusted position.

The essential novel feature of the invention is the cam member engaging opposed members on the rocker-shaft in such manner that with equal longitudinal travel on the part of the curved surfaces, each increment of travel of the cam member produces an equal angle of revolution of the rocker-shaft for such travel; and the angular travel per unit of longitudinal travel remains constant.

The curves of the cam surfaces on the cam member however may be so generated that a minimum of angular travel is produced when the cam member is in mid position, and a maximum of travel produced when the cam member is in either extreme position; this would result in a slow moving back-locked steering gear in mid position and a rapidly acting semi-back-locked steering gear in the extreme positions.

The cam member has its cam surfaces so generated that the shoes on the rock-shaft 1 always remain in close contact with the opposed cam surfaces. In the preferred form both cam surfaces are on opposite edges of one common member by which the construction is greatly simplified and a very compact steering gear is produced which is absolutely positive in its action and easily manipulated by rotating the steering shaft; and at the same time reversal of movement of the steering gear by any exterior pressure applied through the steering-crank to the rocker-shaft 1 is prevented.

I prefer the construction shown in Fig. 1 in which the cam member has exterior cam surfaces and engages between the shoes on the rocker-shaft; as this enables any wear on the cams to be easily compensated for by adjusting the rocker-shaft 1 laterally toward the worm 5; this can be easily accomplished by mounting the rocker-shaft 1 in an eccentric bushing $1^c$, see Fig. 2, within the bearing $9^a$, and if any wear develops the shaft 1 can be moved laterally by slightly rotating the bushing $1^c$ in the bearing $9^a$ so as to bring both shoes into close engagement with their opposed cam surfaces. The eccentric bushing $1^c$ may be securely fastened in adjusted position by clamping the split tubular extension $9^a$ thereon by means of a tap bolt $1^f$ as shown in Fig. 3, or by any other preferred means.

In the modification shown in Fig. 4 the major cam 4 is formed with opposite concave cam surfaces $4^w$, $4^v$ which are respectively engaged by the shoes $2^x$, $3^x$, pivotally mounted as described on the lever $1^a$ attached to the rocker-shaft 1; said cam member being engaged with the worm 5 and operated thereby as above described. This cam member may be made in one piece and the wear taken up by adjusting the shaft 1 in its eccentric bushing as above described; or the cam member may be made in two pieces as shown, rigidly fastened together by bolts and nuts $4^n$, $4^m$, on their meeting ends, so that the opposed cam surfaces may be more conveniently machined.

The operation of this modification will be clearly understood from the above description of the preferred form; and it is obvious that the invention is not restricted to the specific form or arrangement of parts shown in the drawings, as when it is clearly understood a skilled mechanic can change the appearance of the parts while retaining the essential characteristics of the invention.

What I claim is:

1. The combination of a rocker-shaft, opposite cams, and means for moving said cams transversely of said rocker-shaft, a double armed lever connected with said rocker-shaft adjacent the cams, and shoes pivotally connected with said lever at opposite sides of the shaft and respectively engaging the opposite cams.

2. The combination of a rocker-shaft, a cam member having similar opposite cam surfaces, a worm shaft and connections for moving the member transversely of said rocker-shaft; with pivoted shoes connected with said rocker-shaft and engaging the opposite cam surfaces of said cam member.

3. The combination of a rocker-shaft, a cam member having similar opposite cam surfaces, and means for moving said cam member transversely of said rocker-shaft; a double armed lever connected with said rocker-shaft adjacent the cam member, and shoes pivotally connected with said lever at opposite sides of the shaft and respectively engaging the opposite cam surfaces of said cam member.

4. The combination of a rocker-shaft, a cam member having similar opposite cam surfaces, and means for moving said cam member transversely of said rocker-shaft; with a double armed lever connected with said rocker-shaft adjacent the cam member, and shoes pivotally connected with said lever at opposite sides of the shaft and respectively engaging the opposite cam surfaces of said cam member.

5. In a steering gear, the combination of a rocker-shaft, a double armed lever on said shaft, shoes connected to said lever at opposite sides of the shaft and equi-distant from the axis thereof, a cam member having similar but opposite cam surfaces respectively engaging the opposite shoes, and means for moving said cam member transversely of the shaft.

6. In a steering gear, the combination of a rocker-shaft, a double armed lever on said shaft, shoes pivotally connected to said lever at opposite sides of the shaft and equi-distant from the axis thereof, a cam member having similar but opposite cam surfaces respectively engaging the opposite shoes, a rotatable worm, and a worm nut on said cam member engaging said worm, and means for operating the worm.

7. In a steering gear, the combination of a rocker-shaft, a double armed lever on said shaft, shoes pivotally connected to said lever at opposite sides of the shaft and equi-distant from the axis thereof, a cam member interposed between the shoes having similar but oppositely facing cam surfaces engaging the shoes, and means for moving said cam member transversely of the shaft.

8. In a steering gear, the combination of a rocker-shaft, a double armed lever on said shaft, shoes pivotally connected to said lever at opposite sides of the shaft and equi-distant from the axis thereof, a cam member interposed between the shoes having similar but opposite cam surfaces respectively engaging the opposite shoes, a rotatable worm, a worm-nut on said cam member engaging said worm, and means for operating the worm.

9. In a steering gear, a final driven member, an intermediate member, and a primal means of producing longitudinal motion of said intermediate member, said motion being transverse to the final rotating member, said intermediate member carrying opposed cam faces so arranged as to produce positive or negative rotation of said final driven member as longitudinal motion on said intermediate member is positive or negative.

10. In a steering gear, a final driven member, an intermediate member, and a primal means of producing longitudinal motion of said intermediate member, said intermediate member having opposed curved surfaces so arranged with respect to a final driven rotating member that with longitudinal motion in one direction on said intermediate member, one curved surface will force clockwise rotation on the final driven member and longitudinal motion in the opposite direction on said intermediate member will cause the said opposed curved surface to produce anti-clockwise motion on said final driven member.

11. In a steering gear, a final driven member, an intermediate member, and a primal means of producing longitudinal motion of said intermediate member, said intermediate member having opposed curved surfaces so arranged with respect to a final driven rotating member that with longitudinal motion in one direction on said intermediate member, one curved surface will force clockwise rotation on the final driven member, and longitudinal motion in the opposite direction on said intermediate member will cause said opposed curved surface to produce anti-clockwise motion on said final driven member, and the said opposed curved surfaces so arranged that no excess of rotation can occur on said final driven member beyond that forced by the driving curved surface, the opposed curved surface resisting excess of rotation in the final driven member.

12. In a steering gear, the primal member producing a motion on a secondary member which motion is transverse to a final rocker-shaft member, the secondary member having opposed curved surfaces so arranged that said curved surfaces are always in contact with suitable contact arms on said rocker-shaft and a means of adjustment for such contacts on said curves and arms.

13. In a steering gear, a member to be operated, devices connected with said member at points equi-distant therefrom, a cam member having similar but opposite cam surfaces engaging said devices, and means for moving the cam member at right angles to the member to be operated thereby causing the opposite movement of the devices.

14. In a steering gear, the combination of a member to be operated, devices connected with said member at equi-distant points, a cam member having similar but opposite cam surfaces engaging said devices, and means for moving the cam member at right angles to the member to be operated thereby causing the opposite movement of the devices.

15. In a steering gear, the combination of a rocker-shaft, members connected therewith and equi-distant therefrom, a cam member having similar but opposite cam surfaces engaging and holding said members, and means for moving said cam member at right angles to the rocker-shaft thereby causing the shifting of said members and the rocking of the shaft.

16. In a steering gear, the combination of a member to be operated, opposite devices connected with said member at equi-distant points, a cam member having similar but opposite cam surfaces engaging said members, and means for moving the cam member transversely of the shaft, thereby causing the opposite movement of the shoes.

17. In a steering gear, the combination of a rocker-shaft, opposite shoes connected therewith, a cam member having oppositely facing cam surfaces respectively engaging the opposite shoes, and screw-actuated means for moving said cam member transversely to the shaft.

18. In a steering gear, the combination of a rocker-shaft, opposite shoes connected therewith, and a member movable transversely of the rocker-shaft having similar but opposite cam surfaces engaging the opposite shoes, a worm, a worm-nut engaging said cam member, and means for operating said worm.

19. The combination of a rocker-shaft, a member having similar opposite cam surfaces, and means for moving said cam member transversely of said rocker-shaft; with shoes connected with said rocker-shaft and frictionally engaging the opposite cam surfaces of said cam member.

20. In a steering gear, a final drive member, an intermediate member, a primal means for producing longitudinal motion of said intermediate member transversely of said final drive member, said intermediate member having similar but oppositely facing cam surfaces engaging said final drive member, whereby the longitudinal motion of said intermediate member produces rotation of the final drive member.

In testimony that I claim the foregoing as my own, I affix my signature in presence of two witnesses.

DAVID E. ROSS.

Witnesses:
 GEO. C. KUMMING,
 D. L. ROSS.